THOMAS DALE.
Improvement in Cotton Cultivator.

No. 119,015. Patented Sep. 19, 1871.

Witnesses:
Inventor
Thomas Dale
by his Atty
Wm D. Baldwin

119,015

UNITED STATES PATENT OFFICE.

THOMAS DALE, OF RUSSELLVILLE, KENTUCKY.

IMPROVEMENT IN COTTON-CULTIVATORS.

Specification forming part of Letters Patent No. 119,015, dated September 19, 1871.

*To all whom it may concern:*

Be it known that I, THOMAS DALE, of Russellville, in the county of Logan and State of Kentucky, have invented certain new and useful Improvements in Cotton-Cultivators, Scrapers, and Choppers, of which the following is a specification:

My invention relates to wheeled cultivators, and may be applied to other machines than those for the cultivation of cotton only. The object of my invention is to provide an improved means for passing the machine over obstructions and for turning it around at the end of the row; and the invention consists: First, in connecting the cultivator-frame with the axle by means of loops or stirrups attached to the under part of the frame in such manner that the frame may be raised independently of the wheels and axle, as hereinafter set forth. Second, in combining the frame, the loops, the axle, and the driving-gear on the axle with a rotary chopper journaled to the frame, and driven by the gear on the axle in such manner that when the frame is raised to pass obstructions the chopper will be thrown out of gear and become inoperative, as hereinafter more fully set forth.

Figure 1:
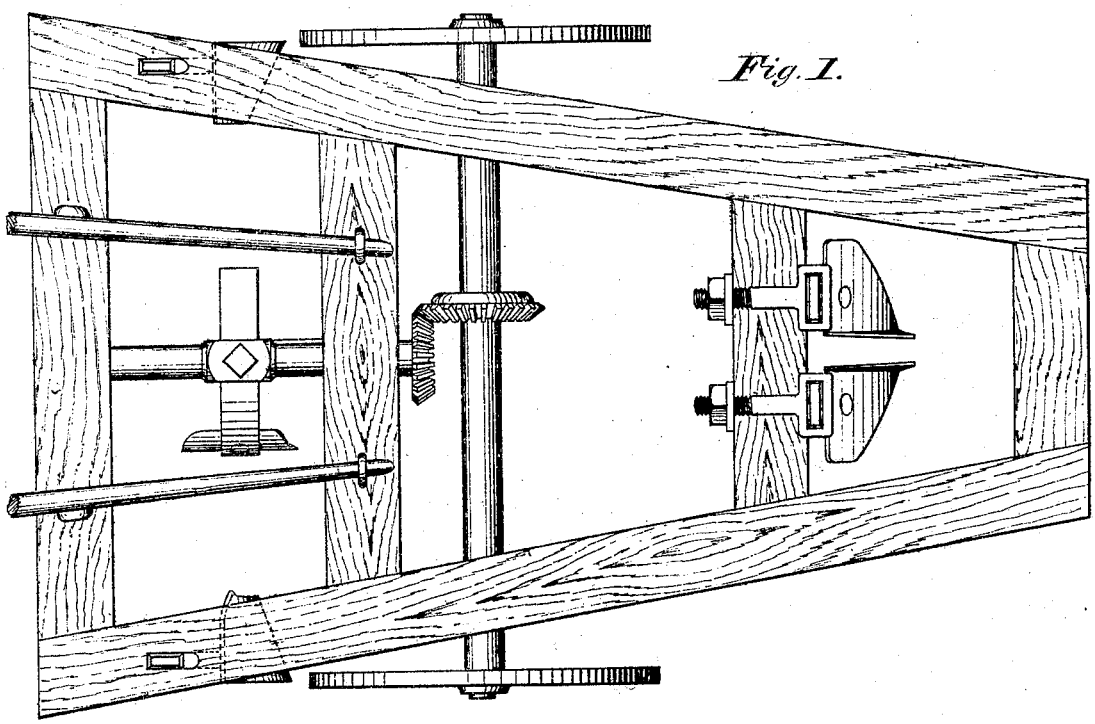
Figure 2:
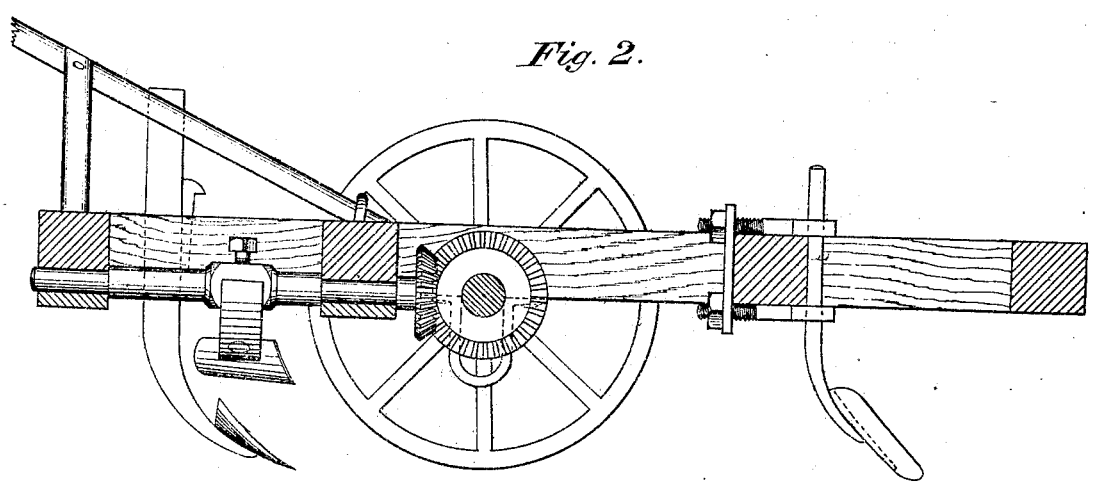

In the accompanying drawing, Figure 1 is a plan or top view of my improved machine; Fig. 2, a vertical sectional elevation of the same in the line $x\ x$ of Fig. 1.

The frame A is of a suitable form and braced with cross-beams $A^1\ A^2$, which also form supports for the scrapers and choppers. The scrapers B B are secured to and adjustable on the cross-beam $A^1$ by means of eyebolts $b\ b$, one above and the other below the beam, and connected by the shank of the scraper, which passes through the eyes of the bolts on one side, and connected by the bolts passing through a link-plate secured by set-screws on the other side of the beam. By this means the scrapers may be readily adjusted both laterally and vertically on the cross-beam, or cultivating-plows may be substituted therefor. A chopper, C, is secured to a shaft, $c$, by a set-screw, so that it may be adjustable. The shaft $c$ has its bearings in the outer frame-timber A and the cross-beam $A^2$, respectively, and a beveled pinion, C', is secured to its inner end. The frame is also provided with two turning-plows, D D, placed in the rear part of the frame, which are made adjustable in a well-known manner. Suitable handles, E E, are secured to the frame for the control of the driver. The driving-wheels F F are secured to the axle G, which is journaled in loops or stirrups H attached to the under part of the frame. A beveled wheel, I, is secured to the axle G, and gears with a beveled pinion, C', secured to the axle $c$ of the rotary chopper when the frame rests upon the axle; but when the frame is raised and the axle is in the lower part of the loops H H, the pinion C' is thrown out of gear with the wheel I and the chopper becomes inoperative.

In operation, when the machine is passing over a stump, root, or other obstruction, the operator may depress the handles, and the frame, bearing on the turning-plows D D as a fulcrum, will raise in front independently of the axle until the axle rests upon the bottom of the loop. When the handles are raised by the operator a similar result is produced. The rear part of the frame is raised independently of the wheels and axle until the axle rests in the bottom of the loop; and when the pressure upon the handles is withdrawn the frame will resume its place upon the axle as before. By this means the plows, scrapers, &c., may be lifted over obstructions, or the machine may be turned around with the greatest ease. As the axle $c$ of the rotary chopper C is secured to the frame of the machine, the pinion C' will necessarily be thrown out of gear with the beveled wheel on the axle when the frame is lifted from the axle. The rotary chopper then becomes inoperative and is not liable to strike or engage with an obstruction over which it passes.

The construction and operation of these machines being so well known, this device will not require further description.

I do not, broadly, claim every mode of combining a cultivator-frame with its axle by means of loops or stirrups, as this has been done before.

I claim as my invention—

1. The combination of the wheels, the axle, the frame arranged above the axle, the stirrups depending from the frame and embracing the axle, the handles rigidly secured to the frame behind the axle, and the plows in rear of the axle, serving as a fulcrum on which to rock the frame, all these members being constructed and operating substantially as set forth, so that the frame, while free to be lifted by the handles, is prevented by the axle from descending below a given point.

2. The combination of the frame, the loops, the axle, and the driving-gear on the axle with a rotary chopper journaled to the frame, and driven by the gear on the axle in such manner that, when the frame is raised to pass obstructions or to be turned in its path, the chopper will be thrown out of gear and become inoperative, substantially as described.

In testimony whereof I have hereunto subscribed my name.

THOMAS DALE.

Witnesses:
  JOS. A. SMITH,
  R. H. MORRIS. (84.)